(No Model.)
A. R. MILLER.
LIME SLAKING MACHINE.
No. 490,612. Patented Jan. 24, 1893.
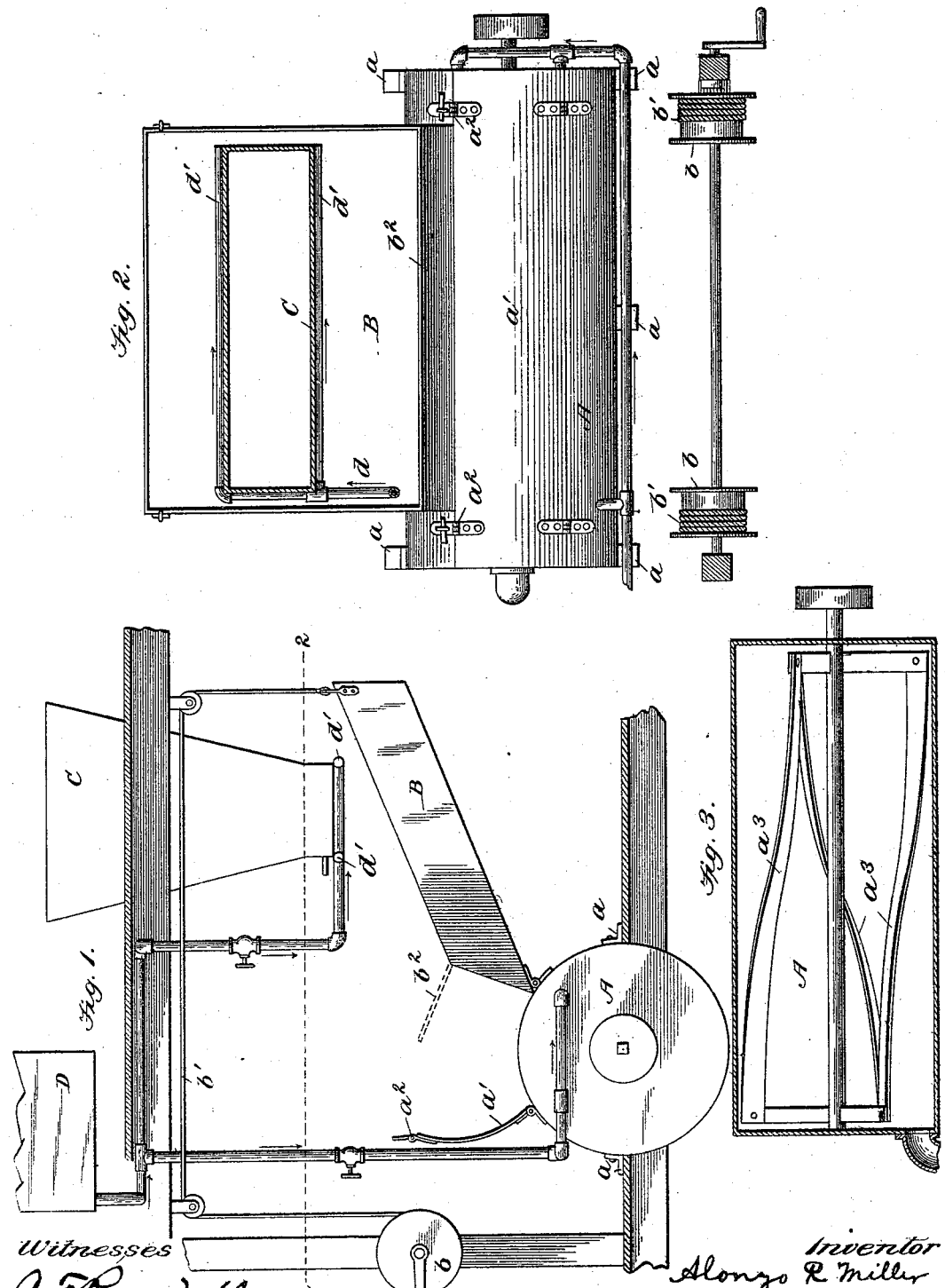
Witnesses
A. F. Randall
Y. M. Copenhaver
Inventor
Alonzo R. Miller
by V. D. Stockbridge
Attorneys

UNITED STATES PATENT OFFICE.

ALONZO R. MILLER, OF WASHINGTON, DISTRICT OF COLUMBIA, ASSIGNOR OF ONE-HALF TO SCOTT NESBITT, OF SAME PLACE.

LIME-SLAKING MACHINE.

SPECIFICATION forming part of Letters Patent No. 490,612, dated January 24, 1893.

Application filed June 20, 1892. Serial No. 437,236. (No model.)

*To all whom it may concern:*

Be it known that I, ALONZO R. MILLER, a citizen of the United States, residing in the city of Washington, District of Columbia, have invented certain new and useful Improvements in Lime-Slaking Machines; and I do hereby declare that the following is a full, clear, and exact description of the invention, such as will enable others skilled in the art to which it appertains to make and use the same.

My invention relates to improvements in lime slaking machines, and it consists in certain combinations hereinafter described and claimed.

It is known that in slaking lime in the open air, as ordinarily practiced, where a mass of lime is gathered in a heap, it is impossible to bring the slaking water into contact with all parts of the body of lime at once or to supply it as rapidly as required, and the consequence is that a large per-cent of the lime is burned, involving loss of strength. It is also known that hot water slakes lime thoroughly in a shorter time than cold water.

The object of my invention is to secure intimate contact of the slaking water with lime so as to prevent caking or the formation of balls and thereby prevent burning, and it is also an object of my invention to confine the heat generated in the process of slaking so as to secure the best results in the shortest period of time. I accomplish these objects by spraying or injecting water into a relatively thin stream of lime as it passes from a hopper in the proper proportion to start the slaking process, then depositing the water and lime in a vessel closing the vessel and constantly agitating the mass and adding water as required inside the vessel until it is brought to the proper condition. In this way, the water and lime are at once brought into contact, and a proper quantity of water is kept in intimate contact, with the lime at all times and the heat generated is confined so that the lime becomes thoroughly slaked, which prevents blistering or popping of the mortar made from such lime.

In the drawings, Figure 1, is a view in elevation showing my improvements as set up in a building and arranged for use; Fig. 2, is a horizontal section on the line 2—2, showing the slaking vessel in elevation, and Fig. 3, is a central horizontal section through the slaking vessel showing the stirring device in elevation.

A is a cylindrical vessel or chamber suitably supported. As shown in the drawings, it is provided with flanges or brackets $a$ $a$ and supported by the floor of a structure. This vessel is provided with a lid $a'$ held tightly in place when the machine is filled by means of suitable locks or catches $a^2$. Within this vessel is mounted a shaft carrying stirring blades $a^3$ for agitating and breaking up the contents.

B is a tilting platform-chute having one end hinged to or pivoted near the mouth of the vessel and the other end suspended and adapted to be raised and lowered by means of windlass $b$ and ropes $b'$. A gate or flap $b^2$ may be connected with the platform at the mouth, if found desirable.

C is a hopper supported as shown in this case by a floor above that by which the vessel is supported. The hopper extends through the floor and discharges onto the platform chute B.

D is a water tank and $d$ a distributing pipe from tank to border pipes $d'$ around the mouth of the hopper. The border pipes $d'$ are perforated to spray the water into and through the lime as it passes from hopper to platform chute. A branch $d^2$ also leads from tank to the slaking vessel, as needed.

To operate this machine, a proper amount of water should be introduced to the tank to slake a quantity of lime of a given character, that when slaked will about fill the slaking vessel. The lime should be fed regularly through the hopper and sprayed with water as it passes to the platform-chute and thus the slaking process begun. The partially slaked lime is then discharged into the slaking vessel where water is introduced at a proper rate easily determined by the operator, the agitator being in constant operation. After the full charge of lime has been introduced to the vessel the lid is closed and the agitation continues until all the water is discharged from the tank and the lime is thoroughly slaked. The entire period for slaking a charge of about forty bushels need not be more than about thirty minutes. By my method and apparatus, the product is uniform in character, the maximum strength of the lime is preserved and this is accomplished in the shortest possible time and at a minimum of expense.

Having now described my invention, what I claim, is—

1. The combination of a slaking vessel, an agitator for incorporating the water and other ingredients within the vessel, means for directing lime to the vessel, a conduit for distributing water over and through the lime to begin the slaking process and a conduit leading to the vessel for supplying water to complete the slaking process, substantially as described.

2. The combination of a slaking vessel, an agitator for incorporating the water and lime within the vessel, a tilting platform-chute discharging into the vessel, a hopper discharging onto the tilting platform, perforated border pipes below the mouth of the hopper for applying water to the falling lime, and means for supplying water to the vessel to complete the slaking process, substantially as described.

3. The combination of a slaking vessel, an agitator within the vessel for incorporating lime and water, means for feeding lime to the vessel, separate means for introducing water to the vessel and a lid or cover for closing the vessel to confine the heat during the final slaking process, substantially as described.

In testimony whereof I affix my signature in the presence of two witnesses.

ALONZO R. MILLER.

Witnesses:
   JOS. H. WOOD,
   CHAS. L. DUBOIS.